UNITED STATES PATENT OFFICE.

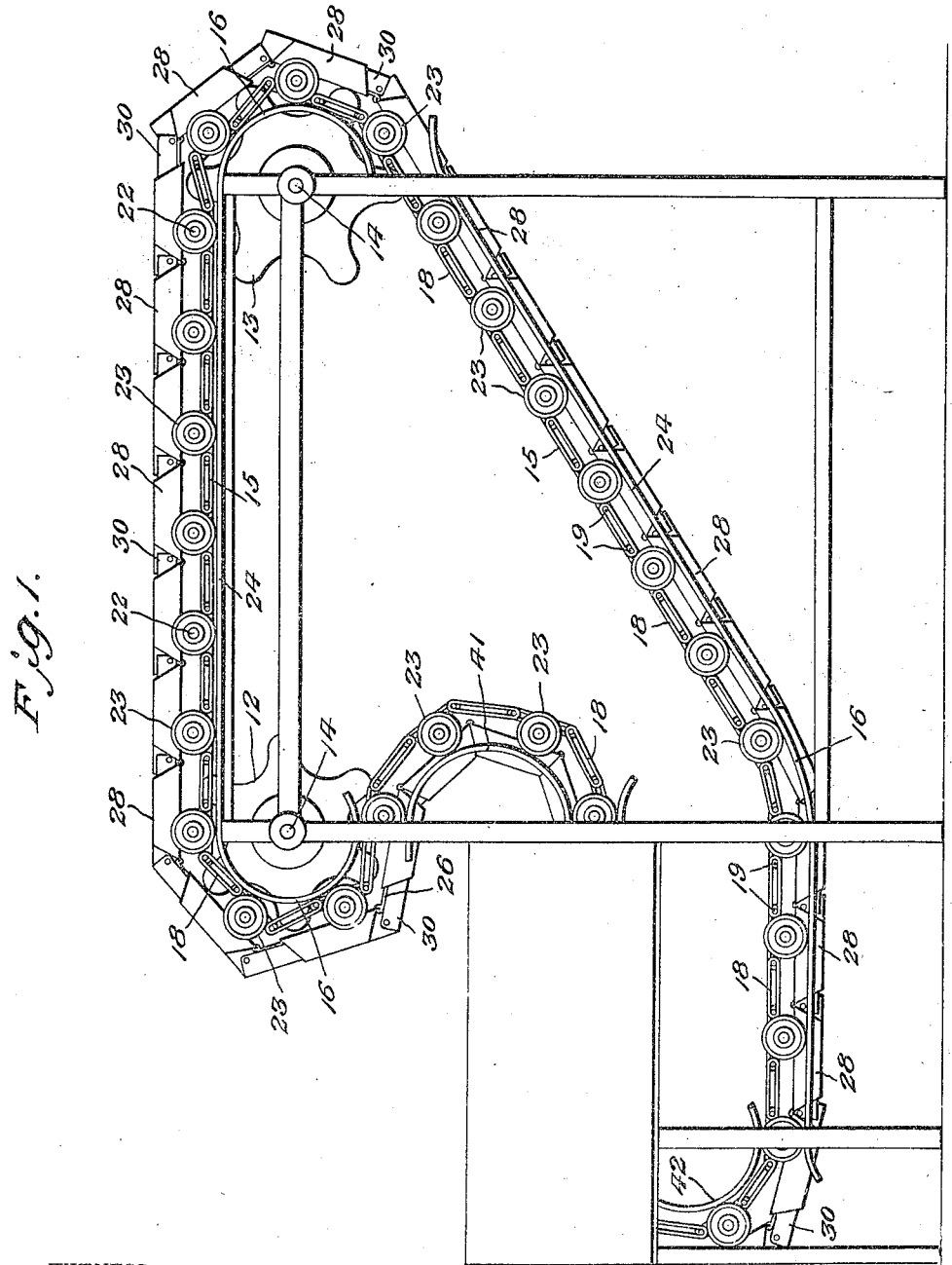

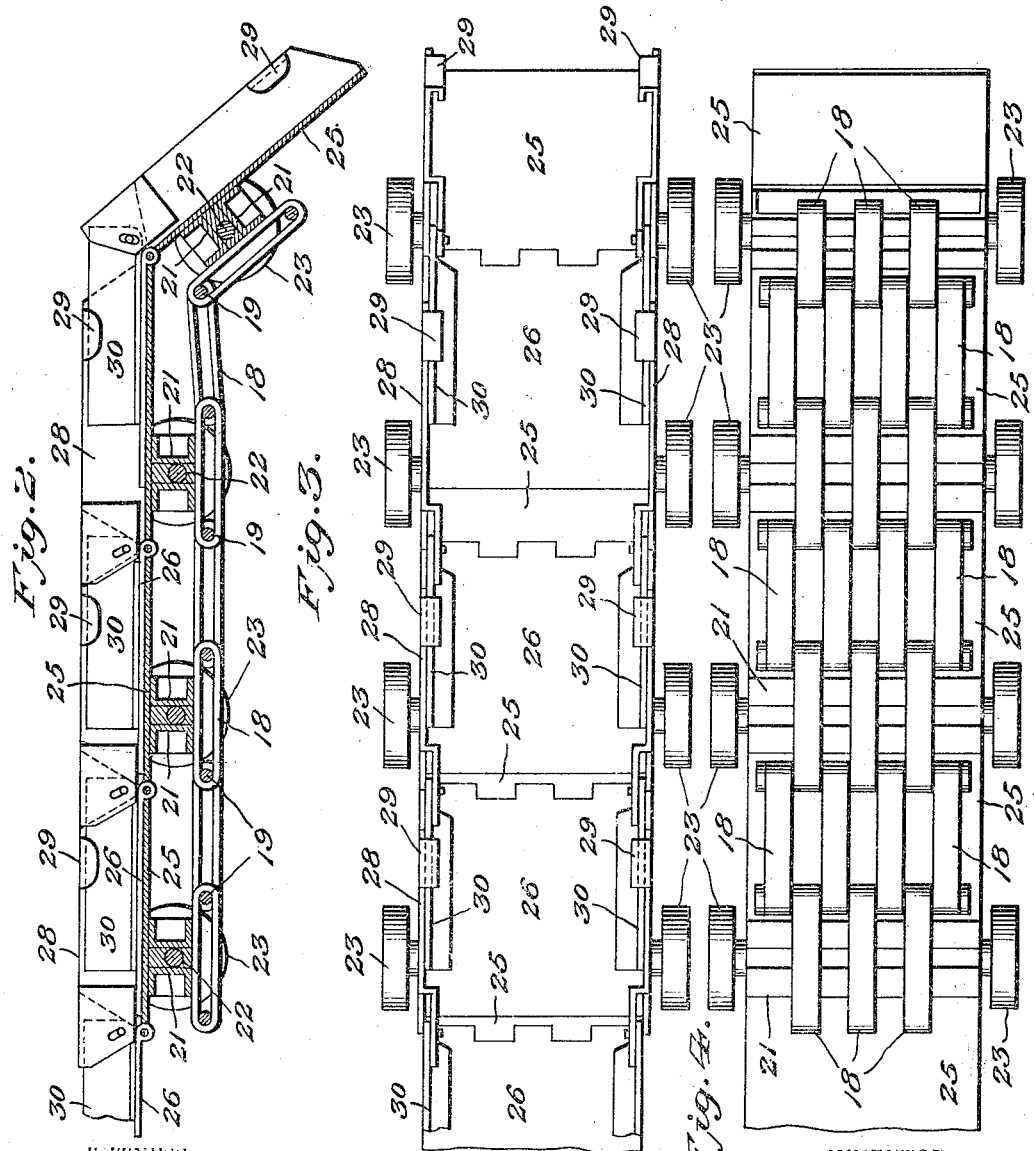

WILSON PINES, OF ROGERS, MICHIGAN.

CONVEYER.

1,352,312.	Specification of Letters Patent.	Patented Sept. 7, 1920.

Application filed October 13, 1919. Serial No. 330,194.

*To all whom it may concern:*

Be it known that I, WILSON PINES, citizen of the United States, residing at Rogers, State of Michigan, have invented new and useful Improvements in Conveyers, of which the following is a specification.

This invention relates to a conveyer, and more particularly to means for conveying crushed stone and other material.

The object is to provide a series of pans of novel construction, with means for connecting the pans and permitting an overlapping arrangement, the connecting means permitting the series of pans to pass around a curved guiding surface, around a sprocket wheel or drum, or other similar element.

A further object is to provide, in connection with a conveyer a chain comprising a series of links with which transverse shafts are connected, these shafts carrying antifriction rollers coöperating with a track; a series of pans, each comprising a main portion and a hingedly connected apron adapted to overlap the adjacent pan and form a continuous conveying surface, whether the conveyer as a whole is traveling in a straight line or traveling around a curved guiding element.

A further object is to provide in connection with the hingedly connected aprons of the individual pans, certain novel means for connecting the side members of the pans with the side members of the aprons.

A still further object is to provide a conveyer of the type indicated which shall be capable of traveling around an S-shaped tripper located at any point in the loop traversed by the conveyer, for the purpose of discharging the material at such point as may be desired.

With the foregoing and other other objects in view, the invention consists in the novel construction, combination and arrangement of elements hereinafter described and claimed.

In the drawings,

Figure 1 is a view of the conveyer in side elevation,

Fig. 2 is a fragmentary longitudinal section,

Fig. 3 is a top plan view,

Fig. 4 is a bottom plan view.

The conveyer forming the subject matter of this invention may be mounted and driven in any suitable manner and by any suitable elements, but in the drawings I have shown a plurality of sprocket wheels 12 and 13 mounted on a transverse shaft 14, these sprocket wheels engaging the links of the conveyer chain, the latter being designated as a whole by the reference number 15. The conveyer may be passed over a curved guiding element 16, or may be otherwise suitably guided.

The conveyer chain comprises a series of links 18 spaced and arranged in the relation shown, the links being connected by transverse bars or pins 19 having their ends turned over in order to secure them and the links in proper position with reference to each other.

Alternate series of links carry shaft supporting members or brackets designated 21, and the latter provide for mounting shaft 22 provided with rollers or idlers 23 on opposite ends. These idlers coöperate with longitudinal tracks 24 and with the curved portion 16 before referred to.

The conveying pans are mounted on the brackets 21, the main portion of each pan being designated 25 and having rigid connection with one of the brackets, and a supplementary portion or apron 26 having hinged connection with the main portion of the pan and overlapping the main portion of an adjacent pan, providing a substantially continuous conveying surface. The side elements 28 of the main portion of the pan are each provided with an inwardly turned ear 29, and pivotally connected with each side member 28 is a side member 30 which in fact forms a portion of the apron since it assists in bridging the space between the pans when the latter are at an angle, as at the right in Fig. 2. The pivotal movement is there shown, and element 30 has been shifted with reference to the remainder of the apron, in view of the pull at the pivotal point incident to the change of angle of the pans. These members 30 are engaged by the aforesaid ears and in view of the manner of assembling the elements, the conveyer is provided with what may be termed a continuous flange on each side thereof, the continuity being unbroken when the pans are traveling around a curved guiding element or passing around a sprocket wheel, or other guiding or driving element. The elements 30 are slidable with reference to the ears, and the lower flanged portions of members 30 are slidable with reference to the surface of the apron.

In order to further emphasize the advantages of this construction, I have shown an S-shaped tripper which may be located at any point along the route of travel of the conveyer and which serves to discharge the material at such point. The curved elements of the S-shaped trigger are designated respectively 41 and 42, and on account of the fact that there are no projecting or loose portions, the series of pans will readily pass around the reversely arranged elements of the tripping device.

What is claimed is—

1. A conveyer comprising a series of pans each including a main portion and a hingedly connected apron, each apron overlapping the main portion of an adjacent pan.

2. A conveyer comprising a series of pans each including a main portion having side flanges and a hingedly connected apron having side flanges, the side flanges of the apron being pivotally connected with the flanges of the main portion of the pan.

3. A conveyer comprising a series of pans, a chain, each pan including a main portion rigidly mounted on the chain, and a hingedly connected apron, the apron of each pan overlapping the main portion of an adjacent pan.

4. A conveyer comprising a chain and a series of pans mounted thereon, each pan including a main portion and a hingedly connected apron, a transverse shaft rigidly mounted with reference to the main portion of each pan, idlers carried by the shaft, a track with which the idlers coöperate, the hingedly connected aprons each overlapping the main portion of an adjacent pan.

5. A conveyer comprising a chain, shafts mounted transversely of the chain at spaced intervals, idlers mounted on the ends of the shafts, guiding elements with which the idlers coöperate, a bracket for mounting each shaft on the chain, a series of pans, each pan being connected with one of the brackets, and each pan including a main portion and a hingedly connected apron, the apron of each pan overlapping the main portion of an adjacent pan.

6. In a device of the class described, an endless chain, means for driving the chain, means for guiding the chain in a curved path, a plurality of pans and means for mounting the pans on the chain in spaced relation, each pan comprising a main portion and a hingedly connected apron, the apron including flanged portions at the sides thereof, slidable over the surface of the apron, and connected with the main portion of the pan independently of the aforesaid hinged connection.

7. In a device of the class described, a chain, means for mounting the chain, means for guiding the chain in a curved path, a series of pans mounted on the chain, each pan including a main portion and a hingedly connected apron, the main portion and the apron each having flanged side elements pivotally connected, retaining elements carried by the flanged portion of the main element of each apron and retaining the flanged portion of the apron in position, for presenting a continuous conveying surface during the movement of the conveyer over the guiding element.

In testimony whereof I affix my signature.

WILSON PINES.